United States Patent
Yi (10) Patent No.: US 8,032,425 B2
(45) Date of Patent: Oct. 4, 2011

(54) EXTRAPOLATION OF BEHAVIOR-BASED ASSOCIATIONS TO BEHAVIOR-DEFICIENT ITEMS

(75) Inventor: Jin Y. Yi, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1347 days.

(21) Appl. No.: 11/424,730

(22) Filed: Jun. 16, 2006

(65) Prior Publication Data

US 2008/0004989 A1    Jan. 3, 2008

(51) Int. Cl.
*G06Q 30/00* (2006.01)
(52) U.S. Cl. .................................... 705/26.7; 705/26.64
(58) Field of Classification Search .................... None
See application file for complete search history.

(56) References Cited

U.S. PATENT DOCUMENTS

| | | | |
|---|---|---|---|
| 5,583,763 A | 12/1996 | Atcheson et al. | |
| 5,909,023 A * | 6/1999 | Ono et al. | 235/380 |
| 6,185,558 B1 | 2/2001 | Bowman et al. | |
| 6,321,221 B1 | 11/2001 | Bieganski | |
| 6,356,879 B2 | 3/2002 | Aggarwal et al. | |
| 6,438,579 B1 | 8/2002 | Hosken | |
| 6,460,036 B1 | 10/2002 | Herz | |
| 6,691,163 B1 * | 2/2004 | Tufts | 709/224 |
| 6,782,370 B1 * | 8/2004 | Stack | 705/10 |
| 6,912,505 B2 * | 6/2005 | Linden et al. | 705/14.53 |
| 7,092,936 B1 * | 8/2006 | Alonso et al. | 707/737 |
| 7,152,061 B2 | 12/2006 | Curtis et al. | |
| 7,386,547 B2 * | 6/2008 | Grasso et al. | 1/1 |
| 7,440,943 B2 * | 10/2008 | Grasso et al. | 1/1 |
| 7,720,720 B1 | 5/2010 | Sharma et al. | |
| 7,752,077 B2 * | 7/2010 | Holden et al. | 705/26 |
| 7,756,879 B2 * | 7/2010 | Parsons et al. | 707/748 |
| 7,853,485 B2 * | 12/2010 | Song et al. | 705/26.8 |
| 7,912,755 B2 | 3/2011 | Perry et al. | |
| 2002/0019763 A1 * | 2/2002 | Linden et al. | 705/10 |
| 2002/0052873 A1 * | 5/2002 | Delgado et al. | 707/7 |
| 2002/0198882 A1 * | 12/2002 | Linden et al. | 707/10 |
| 2003/0023499 A1 * | 1/2003 | Das et al. | 705/26 |
| 2003/0023538 A1 * | 1/2003 | Das et al. | 705/37 |
| 2003/0130975 A1 * | 7/2003 | Muller | 706/50 |
| 2004/0254911 A1 * | 12/2004 | Grasso et al. | 707/1 |
| 2005/0189415 A1 * | 9/2005 | Fano et al. | 235/383 |

(Continued)

OTHER PUBLICATIONS

Schafer, Ben J., et al., "Recommender Systems in E-Commerce," Proceedings of the 1st ACM Conference on Electronic Commerce, ACM Press, Nov. 1999, pp. 158-166.

(Continued)

*Primary Examiner* — Mussa Shaawat
(74) *Attorney, Agent, or Firm* — Knobbe, Martens, Olson & Bear LLP (57) ABSTRACT

Behavior-based associations are extrapolated to items for which the quantity of collected user activity data is insufficient to create meaningful or reliable behavior-based associations ("behavior-deficient" items). The behavior-based associations are extrapolated based on content-based associations, or another type of "substitutability" association, between the behavior-deficient items and other items. The items can be any type of item for which user behaviors (e.g., purchases, accesses, downloads, etc.) can be monitored and analyzed to detect behavior-based associations, and for which item content or other available information can be used to assess item substitutability. For example, the items can be products represented in an electronic catalog, web pages or other documents accessible on a network, or web sites.

18 Claims, 7 Drawing Sheets

U.S. PATENT DOCUMENTS

| | | | |
|---|---|---|---|
| 2005/0222987 A1 | 10/2005 | Vadon | |
| 2006/0041548 A1* | 2/2006 | Parsons et al. | 707/5 |
| 2006/0167757 A1* | 7/2006 | Holden et al. | 705/26 |
| 2006/0212362 A1* | 9/2006 | Donsbach et al. | 705/26 |
| 2007/0118498 A1* | 5/2007 | Song et al. | 707/1 |

OTHER PUBLICATIONS

M. K. Condliff, et al., "Bayesian Mixed-Effect Models for Recommender Systems," ACM S[GIR '99 Workshop on Recommender Systems: Algorithms and Evaluation, 1999.

Robin Burke, "Hybrid Recommender Systems: Survey and Experiments," published in User Modeling and User-Adapted Interaction, vol. 12, No. 4, Nov. 2002, pp. 331-370 (ISSN: 0924-1868).

Eirinaki, M., et al., SEWep: Using Site Semantics and a Taxonomy to Enhance the Web Personalization Process, ACM Press, SIGKDD '03, dated Aug. 24-27, 2003, pp. 99-108.

Andrew I. Schein et al., "Methods and metrics for cold-start recommendations," Proceedings of the 25th annual international ACM SIGIR conference on Research and development in information retrieval, 2002, pp. 253-260.

Schafer, Ben J., "E-Commerce Recommendation Applications", Data Mining and Knowledge Discovery, vol. 5, pp. 115-153, 2001.

* cited by examiner

EXTRAPOLATION OF BEHAVIOR-BASED ASSOCIATIONS TO BEHAVIOR-DEFICIENT ITEMS

BACKGROUND OF THE INVENTION

1. Field of the Invention

The present invention relates to data mining methods for discovering and quantifying associations between selectable items, and associations between search queries (or other forms of user input) and selectable items. The selectable items may, for example, be products represented in an electronic catalog, documents, web pages, web sites, media files, and/or other types of items for which behavioral associations can be detected.

2. Description of the Related Art

A variety of methods are known for detecting behavior-based associations (i.e., associations based on user behaviors) between items stored or represented in a database. For example, the purchase histories or item viewing histories of users can be analyzed to detect behavior-based associations between particular items represented in an electronic catalog (e.g., items A and B are related because a relatively large number of those who purchased A also purchased B). See, e.g., U.S. Pat. No. 6,912,505. As another example, the web browsing histories of users can be analyzed to identify behavior-based associations between particular web sites and/or web pages. See, e.g., U.S. Pat. No. 6,691,163 and U.S. Pat. Pub. 2002/0198882.

The detected behavior-based associations are typically used to assist users in locating items of interest. For example, in the context of an electronic catalog, when a user accesses and item's detail page, the detail page may be supplemented with a list of related items. This list may, for example, be preceded with a descriptive message such as "people who bought this item also bought the following," or "people who viewed this item also viewed the following." The detected associations may also be used to generate personalized recommendations that are based on the target user's purchase history, item viewing history, or other item selections.

It is also known in the art to analyze the search behaviors of users to detect associations between particular search queries and particular items. The detected associations may be used to rank search result items for display, and/or to supplement a search result set with items that do not match the user's search query. For example, when a user conducts a search, the matching items having the strongest behavior-based associations with the submitted search query may be elevated to a more prominent position in the search results listing; in addition, one or more items that do not match the search query, but which have strong behavior-based associations with the search query, may be added to the search result listing. See, e.g., U.S. Pat. No. 6,185,558.

One problem with relying on behavior-based associations is that the quantity of behavioral data collected for a particular item may be insufficient to create behavior-based associations for that item. This may be the case when, for example, new items are added to an electronic catalog, or when new web pages or documents are added to a data repository. Unfortunately, the problem is self perpetuating because popular items (items with behavioral associations) typically remain popular due to their heightened exposure, while new and generally unknown items remain unpopular due to their lack of exposure. This problem is sometimes referred to as the "cold-start" problem.

One possible way to reduce the cold-start problem is to supplement the behavior-based associations with content-based associations between items. For example, a new item (one for which little or no behavioral data exists) can be associated with other items based on similarities between the attributes or other content of the items. These content-based associations may then be used to increase the new item's exposure in the same way behavior-based associations are used.

Unfortunately, content-based associations tend to be less reliable than behavior-based associations, especially if the item content is not highly consistent in format. In addition, content-based associations frequently are not a good predictor of the items users desire to purchase, view or otherwise select in combination, and thus tend to be less useful. As one example, suppose that an electronic catalog system displays lists of related products on product detail pages, with these lists generated automatically based on aggregate purchase histories. In such system, the detail page for a particular product (e.g., a printer) may desirably list products that are very different from, but complementary of, that product, such as commonly purchased accessories for the product (e.g., an ink cartridge for the printer). If content-based associations were used in place of the behavior-based associations, however, these complementary products likely would not appear since their attributes would typically be dissimilar to those of the featured product.

SUMMARY

The present invention comprises computer-implemented systems and methods for extrapolating behavior-based associations to "behavior-deficient" items (generally items for which the collected user activity data of a particular type is insufficient to create meaningful or reliable behavior-based associations). The behavior-based associations are extrapolated based on "substitutability" associations between the behavior-deficient items and other items. These substitutability associations may be based on the attributes or content of the items, in which case they are referred to as content-based associations. The items may, for example, be products represented in an electronic catalog, web pages or other documents accessible on a network, or web sites. More generally, the items can be any type of item for which user behaviors (e.g., purchases, accesses, downloads, etc.) can be monitored and analyzed to detect behavior-based associations, and for which suitable substitutability associations may be detected.

In one embodiment, the behavior-based associations that are extrapolated are associations between selectable items. For example, suppose that item A is behaviorally associated with items B and C because, for example, users who select A also frequently select B, and/or C. Suppose further that item A has a content-based association with item X (e.g., because many of the attributes of A and X are the same), and that item X is a behavior-deficient item (e.g., because it is new or unpopular). In accordance with the invention, item A's behavior-based associations with B and C may be extrapolated to, or "inherited by," item X such that new associations are created between X and B and between X and C. Note that X may be dissimilar in content to both A and C in this example, such that no associations would be created between X and B and between X and C if the associations were based solely on item content.

The strengths of these newly created associations may be dependent upon both (a) the degree to which items A and X are similar in content, and (b) the strengths of the behavior-based associations between A and B and between A and C, respectively. The strengths of the new associations may also depend on whether X is similar in content to any other items that have a behavior-based association with B and/or C. The newly created associations may, but need not, be terminated or phased out as sufficient user activity data becomes available for creating behavior-based associations between X and other items.

In another embodiment, the behavior-based associations that are extrapolated to behavior-deficient items are associations between search queries and selectable items. These query-item associations are used to rank search results for display, and/or to supplement search results with additional items that do not match the search query. For example, suppose that search query Q is behaviorally associated with item A because, for example, users who submit Q frequently select item A from the search results listing. Suppose further that a new and thus behavior-deficient item, item B, is introduced into the search space, and that item B is similar in content to, and thus substitutable with, item A. In accordance with the invention, a new association may automatically be created between Q and item B. This new association may cause item B to be displayed at a more prominent position in the search results listing for Q, and if item B does not match Q, may cause item B to be added to the search result listing for Q.

The invention may also be used to extrapolate other types of associations to behavior-deficient items. For example, a strong behavior-based association may exist between a particular ad and a particular web page based on the relatively high click-through rate experienced when the ad is displayed on this page. When a new web page (potentially on an entirely different web site) becomes available for purposes of displaying ads, this new page may inherit the behavior-based association with the ad, causing the ad to be selected (or selected more frequently than otherwise) for display on the new page.

Neither this summary nor the following detailed description purports to define the invention. The invention is defined by the claims.

DETAILED DESCRIPTION OF SPECIFIC EMBODIMENTS

Specific embodiments of the invention will now be described with reference to the drawings. These embodiments are intended to illustrate, and not limit, the present invention. The invention is defined by the claims.

I. Electronic Catalog Embodiment

Figure 1:
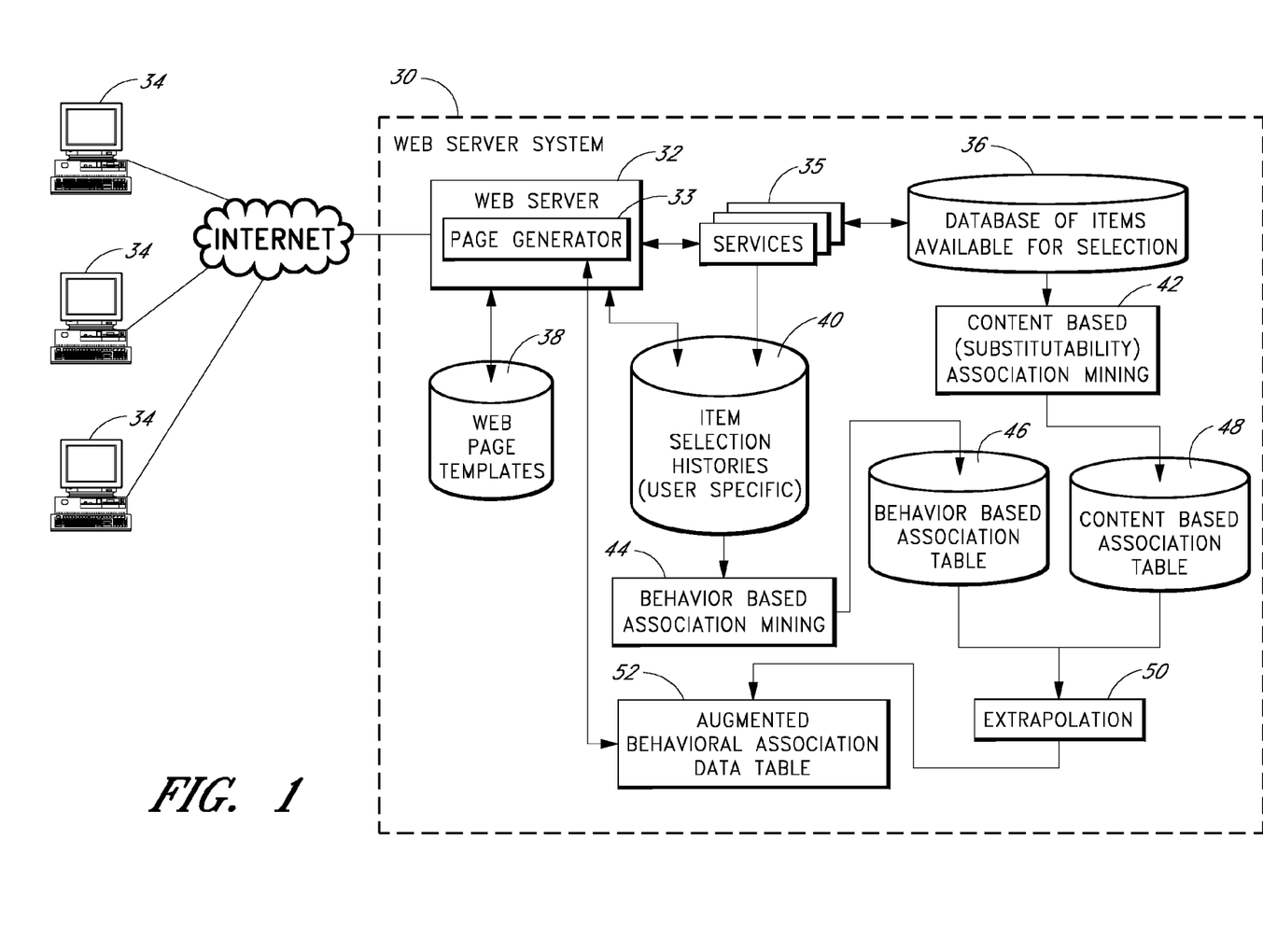
FIG. 1 illustrates a web site system according to one embodiment of the invention.

FIG. 1 illustrates an embodiment in which the invention is employed for purposes of detecting associations between items represented in a browsable electronic catalog of items. The detected associations between items may be used for various purposes, such as to supplement item detail pages with lists of related items, and/or to generate personalized recommendations for particular users. See, e.g., U.S. Pat. No. 6,912,505, the disclosure of which is hereby incorporated by reference.

As is common, the electronic catalog in this embodiment contains item content supplied by many different entities. For example, some of the item content may be supplied by a variety of different marketplace sellers, as described in U.S. Pub. 2003/0200156 A1, the disclosure of which is hereby incorporated by reference. As a result, the catalog data lacks a sufficient degree of uniformity or consistency to reliably detect content-based associations between items. Consequently, behavior-based associations (those based on collected user activity or "behavioral" data, such as users' purchase histories, rental histories, detail page viewing histories, download histories, etc.) are generally more reliable than content-based associations. Behavior-based associations may be preferred over content-based associations for other reasons as well, depending on how the detected associations are used.

In this type of system, the quantity of behavioral data collected for a given item, may, in many cases, be insufficient to reliably detect behavior-based associations between that item and any other items. This may be the case where, for example, an item was only recently added to the electronic catalog, or is relatively unpopular. Rather than merely relying on content-based associations for such items, the present embodiment uses a combination of content mining and behavioral mining to create new associations for these items. This is accomplished by using content-based associations, or alternatively another type of "substitutability" association (i.e., an association that represents or is based on a degree to which particular items are substitutable with each other), to effectively extrapolate behavior-based associations to the new or unpopular items.

For example, suppose that a behavior-based association exists between items A and B, and that item C is a new item for which little or no behavioral data exists (i.e., it is a behavior-deficient item). Suppose further that items B and C are very similar in content, as determined, for example, by comparing their respective attributes (e.g., name, category, author, subject, description, manufacturer, price, etc.). In this scenario, the present embodiment effectively extrapolates or extends the B's association with A to item C, such that C effectively inherits a behavior-based association with A. (If B has behavior-based associations with other items, C may inherit those as well.) This new association between A and C may be referred to as an extrapolated or inherited association.

The strength of this new association between items A and C depends upon both the strength of the A-B behavioral-based association and the strength of the B-C content-based or other substitutability association. The strength of the A-C association also preferably depends on whether A and C are associated through any other "paths." For instance, the association between A and C will be stronger if A also has a behavior-based association with D, and D has a content-based association with C. As behavioral data is collected over time for item C, the extrapolated relationships created between item C and other items is may, but need not, be phased out or terminated in favor of pure behavior-based associations. There is benefit to keep applying the process of extrapolating associations even when enough signal is present for pure behavioral relationships. Effectively, the extrapolated associations are generated by taking the "nearest-neighborhood" of substitutable items for any given item in aggregate. Common behavioral associations within the nearest neighborhood would be boosted due to this aggregated treatment. For example, there may be some telescopes that have accessories that have higher behavioral association weights than a star-guide map. However, the star-guide map may be common to all the telescopes, so the guide's weight would get boosted in the aggregate. This behavior has been empirically shown to help reduce the erroneous associations from noisy behavioral information.

As depicted in FIG. 1, a web server system 30 includes a web server 32 that generates and serves pages of a host web site to computing devices 34 of end users. Although depicted as desktop computers for purposes of illustration, the computing devices 34 may include a variety of other types of devices, such as cellular telephones and Personal Digital Assistants (PDAs). The web server 32 may be implemented as a single physical server or a collection of physical servers. The invention may alternatively be embodied in another type of multi-user interactive system, such as an interactive television system, an online services network, or a telephone-based system in which users select items to acquire via telephone keypad entries and/or voice.

The web server 32 provides user access to an electronic catalog of items represented within a database 36 or a collection of databases. The items represented in the database 36 may include or consist of items that may be purchased, rented, licensed, downloaded, or otherwise acquired via the web site (e.g., consumer electronics products; household appliances; book, music and video titles in physical and/or downloadable form; magazine subscriptions, computer programs, documents, etc.). The items may consist primarily or exclusively of physical products that are shipped to users, and/or of digital products that are delivered over a network. Many hundreds of millions of different items may be represented in the database 36. The catalog data stored for a given item in the database 36 typically includes a number of different attributes (e.g., name, manufacturer, author, category, subject, color, browse node, price, etc.), which may be represented as name-value pairs. Different catalog items may have different attributes. As is conventional, the items may be arranged within a hierarchy of browse categories to facilitate navigation of the catalog.

As will be recognized, the present invention is not limited to items that can be purchased or otherwise acquired from an electronic catalog. For example, the invention may also be employed to derive behavioral relationships between web sites, web pages, business represented in an online business directory, blogs, chat rooms, authors, brands, people (e.g., in the context of a social networking system), and documents stored on a company network. In general, the inventive methods described herein can be applied to any type (or types) of item for which both (a) the associated item attributes or content, or some other source of information, permits the detection of items that are highly substitutable, and (b) activity data of users, such as purchase histories, viewing histories, explicit ratings, etc., can be used to detect behavior-based associations.

As illustrated, the web server 32, which may include any number of physical servers, runs a page generator component 33 that dynamically generates web pages in response to requests from the user computing devices 34. The web pages are generated using a repository of web page templates 38, and using data retrieved from a set of services 35. The types of services 35 can vary widely, and may include, for example, a catalog service that returns catalog data for particular items, a search service that processes search queries submitted by users, a recommendation service that generates and returns personalized item recommendations for users, and a transaction processing services that processes purchases and/or other types of transactions.

In one embodiment, users of the web site can obtain detailed information about each item by accessing the item's detail page within the electronic catalog. Each item detail page may be located by, for example, conducting a search for the item via a search engine of the web site, or by selecting the item from a browse tree listing. Each item detail page may provide an option for the user to acquire the item from a retail entity and/or from another user of the system.

As illustrated in FIG. 1, the web server system 30 and/or the services 35 maintain item selection histories 40 for each user of the web site. The item selection history 40 of each user identifies catalog items selected by that user via the web site, preferably together with the associated dates and times of selection. Depending upon the nature and purpose of the web site (e.g., retail sales, user-to-user sales, movie rentals, customer reviews, music downloads, etc.), the item selection histories may, for example, include item purchase histories, item rental histories, item detail page viewing histories, item download histories, or any combination thereof. In some embodiments, the item selection histories 40 may include data obtained from external sources, such as the web site systems of business partners, browser toolbars of users, or customer credit card records. Item selection histories 40 of many hundreds of thousands or millions of unique users may be maintained and analyzed by the system 30. Each user account may be treated as a separate user for purposes of maintaining item selection histories; thus for example, if members of a household share a single account, they may be treated as a single user.

As further illustrated in FIG. 1, a behavior-based association mining component 44 collectively analyzes or "mines" the item selection histories of the users periodically (e.g., once per day) to detect and quantify behavior-based associations between particular catalog items. The methods described in U.S. Pat. No. 6,912,505, referenced above, may be used for this purpose. The behavior-based association mining component 44 generates a table 46 or other data structure that identifies pairs of items for which a behavior-based association has been detected. For each such pair of items, the table 46 also stores a behavioral association strength value or "weight" indicating the strength of the association. The associations may be based on any type or types of recorded user activity, such as purchases, rentals, viewing events, shopping cart adds, and/or downloads. In general, the strength of the association between two items depends on how many unique users who selected one item (for purchase, viewing, etc.) also selected the other. These counts are proportioned against the individual item selection counts. Using the proportions, significance tests or signal processing techniques may be performed to reduce the number of invalid associations due to noise in the data. Each entry in the table 46 may, for example, be in the form of a one-to-many mapping that maps a particular item to a list of the most closely related items, together with associated weights. Behavior-based associations that fall below a selected strength threshold may be excluded from the table 46.

Also illustrated in FIG. 1 is a content-based association mining component 42 that periodically and collectively mines the electronic database of items 36 to detect and quantify content-based associations between particular catalog items. The content-based association mining component 42 generates a content-based associations table 48 that identifies pairs of items that share similar characteristics or content. For each such pair, the table 48 also stores a respective content-based association strength value or weight representing the strength of the content-based association. Each such weight value also generally represents the degrees to which the corresponding items are substitutable or interchangeable with each other. Any of a variety of known methods for comparing item attributes may be used to detect and quantify the content-based associations. Techniques from natural language processing such as simple inter-document term frequency or more complicated algorithms such as latent semantic analysis may be used. Also, pattern recognition techniques such as neural networks or Bayesian belief networks operating over the content feature space may be used. Content-based associations that fall below a selected threshold (e.g., 80% similarity if the strengths are in a probabilistic domain) may be excluded from the table 48.

The content-based analysis may be limited to pairs of items in which one of the two items is a "behavior-deficient" item. For example, if item purchases are used to detect the behavior-based associations, an item may be treated as behavior deficient if it has been purchased less than ten times, or if the purchase behaviors of those who have purchased it are insufficiently reliable to associate it with any other item. An item may be behavior deficient if, for example, it has only recently been added to the electronic catalog, or if it is an obscure, high priced, or otherwise unpopular item.

The behavior-based and content-based associations tables 46, 48 are periodically analyzed in combination by an extrapolation component 50 to selectively extrapolate or propagate behavior-based associations to unpopular items, as described above. For example, if the behavior-based table 46 indicates that B is behaviorally associated with C, D and E, and the content-based table 48 indicates that unpopular item U has a content-based association with B, the extrapolation component 50 may create associations between U and C, U and D, and U and E. The extrapolation component 50 thereby effectively augments the behavior-based associations table 46 with these extrapolated associations, particularly for "behavior-deficient" items. This augmented behavioral association data table is depicted in FIG. 1 as element 52, although the augmented table may actually be created by simply adding new entries to the behavior-based associations table 46. The task of creating extrapolated associations may, for example, be triggered by the generation of a new behavior-based associations table 46.

As with the behavior-based association table 46, the augmented behavioral association data table 52 includes an association weight value for each pair of associated items. For extrapolated associations, the weights are generated based on the corresponding behavior-based and content-based weights, as described below. These extrapolated association weights are preferably normalized with (on the same scale as) the purely behavior-based weights. If the augmented table is simply created by adding new entries to the behavior-based association table, the extrapolated association weights must be in the same domain as the true behavioral-based weights The augmented behavioral association data table 52 may be used for a variety of purposes. For example, when a user accesses an item detail page of an item, the web server 32 may access the augmented behavioral association data table 52 to look up a list of related items, and may incorporate this list into the item detail page. If the item detail page is for an unpopular item, this list of related items will ordinarily be based exclusively on extrapolated associations created for the unpopular item. The augmented behavioral association data table 52, including the association weights stored therein, may also be used to generate personalized recommendations that are based on the item selections of the target user. The methods described in U.S. Pat. No. 6,912,505, referenced above, may be used for this purpose. As yet another example, the augmented behavioral association data table 52 may be used to augment a search results set with one or more items that are closely related to those that match the user's search query.

In the embodiment of FIG. 1, the item associations recorded in the behavior-based table 46 and the augmented behavioral association data table 52 are preferably "directional" associations. For instance, although item A may be mapped to item B, item B is not necessary mapped to item A. Thus, for example, although item B may appear on item A's detail page (as a related item), item A may not appear on item B's detail page. In other embodiments, the associations may be non-directional.

Figure 2:
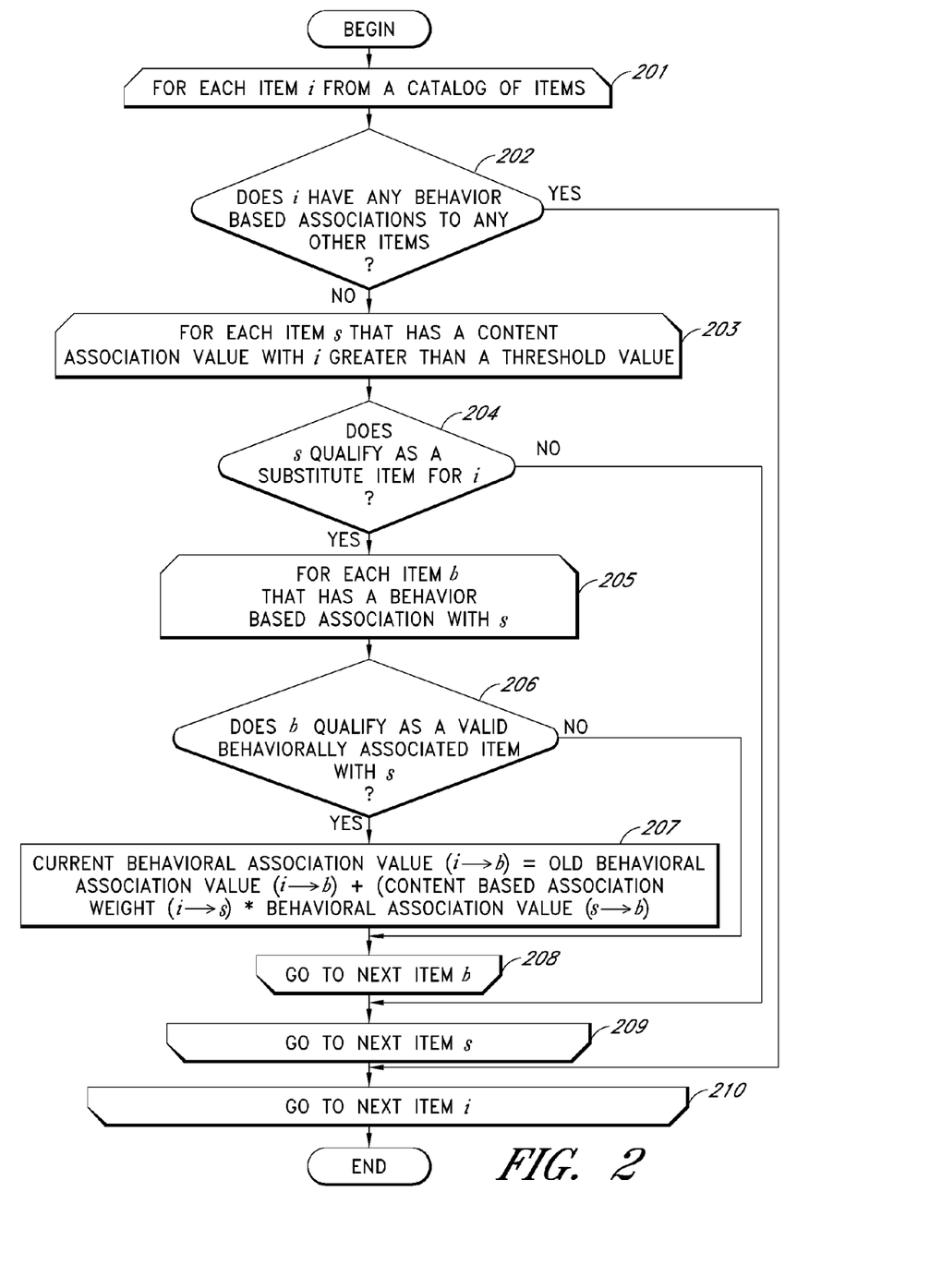
FIG. 2 is a flow chart illustrating one embodiment of a process for creating new item associations using content-based and behavior-based associations between items.

FIG. 2 is a flow chart which illustrates one example of the steps that may be performed by the extrapolation component 50. As depicted by step 201, each item, i, in the catalog is analyzed in sequence. In step 202, the current item is checked to determine whether it is "popular," which in the sample flow chart involves determining whether it has any behavior-based associations to any other items. (In the embodiment of FIG. 2, every item is treated as either popular or unpopular, with popularity being based on collected user activity data.) In other embodiments, any other standard may be used to classify whether or not an item is popular. For example, an item with less than a certain threshold number of behavioral associations may be considered unpopular.

Returning to the sample flow chart of FIG. 2, if the item i does have any such associations, i.e., if it is a popular item, then according to step 210 the process skips to the next item and returns to step 202. If however, item i is unpopular, then item i is selected for further analysis by obtaining each item s that has a content association value with item i greater than a threshold value. In other words, in step 203 an item s that has significant content-based similarity to item i is identified. This significance indicates the items' substitutability or interchangeability.

Next, in step 204, item s may be further analyzed to whether or not it is substitutable for i. This step allows for additional error-reducing mechanisms which may ensure that s is substitutable for i. For example, a red men's polo shirt may be highly content related (step 203) with a red women's polo shirt, but they may not be substitutable (step 204), since a man would not wear a woman's shirt, and vice versa. Step 204 thus reduces this possibility for error. As described in U.S. Pat. No. 6,912,505, one method that may be used to assess whether two items are substitutes for each other is to monitor how frequently they are selected for viewing within common browsing sessions. Item classifiers such as "men" and "women" may also be used to assess substitutability.

If s is not substitutable for i, then the process continues to search (step 209) until a substitutable item is found. Once a substitutable item s is found, then the process in step 205 searches to find each item b that has a behavior-based association with s by skipping over items without behavior-based associations (step 208). As an additional error-reducing mechanism, in step 206 each item b that does have a behavior-based association with s is checked to determine if that behavior-based association with s is valid. For example, a set of batteries may have a behavior-based association with an electronic device because those batteries are often purchased with the electronic device, but if those batteries are incompatible with the device (which may be determined, e.g., by examining return orders), then the behavior-based association between the batteries and the electronic device may be considered invalid.

Finally, after an item b that has a valid behavior-based association with s is found, where s is a validly substitutable item for i, then in step 207, the current behavior-based association weight from i to b is assigned the value of the old behavior-based association weight from i to b plus the product of the content-based association weight from i to s multiplied by the behavior-based association weight of s to b. Examples of this value assignment will be discussed below with reference to FIGS. 3A-3D. The use of multiplication to combine the i to s content-based and s to b behavior-based weights and the use of summation to combine this result with the any previous i to b behavior-based weight is only specific to this embodiment. Alternatives such as linear combination instead of multiplication or noisy-OR instead of summation may be used. After each item b that has a behavior-based association with each item s substitutable for each item i in the catalog is processed (steps 208-210), then the process ends. The system may thus allow for unpopular items to inherit behavioral association data from a single item as well as multiple items. In certain embodiments, a set limit can be placed on the number of relationships that are created during processing in order to address the substantially large amounts of relationships that can be created in web space.

The graphs shown in FIGS. 3A-3D will be used to illustrated an example scenario. In these graphs, each node represents a respective item in the electronic catalog, and each edge (shown as an arrow) represents an association between two items. The numbers included in-line with the arrows represent corresponding association weights or strengths, with behavioral association weights (including those created via extrapolation) being on a scale of zero to infinity, and content-based weights being on a scale of zero to one.

Figure 3A:
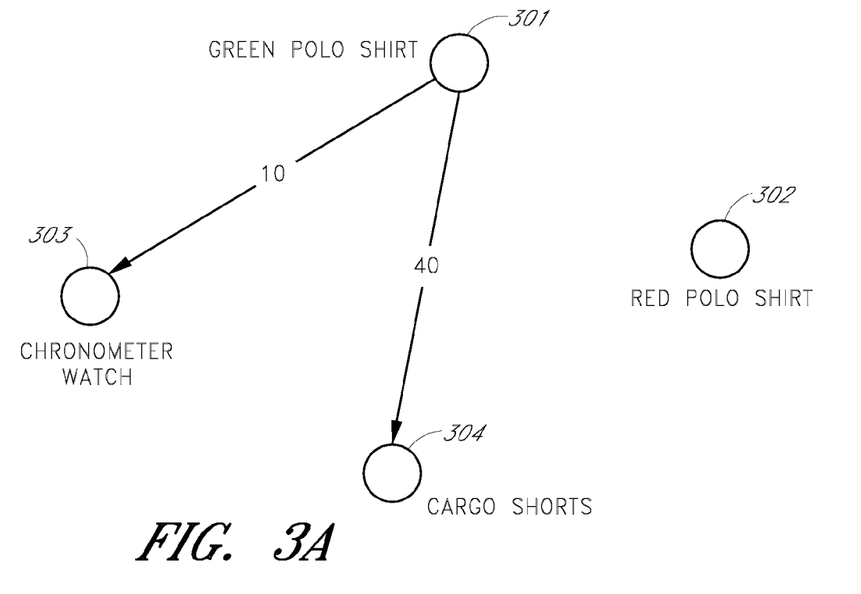
FIG. 3A is a graph depicting behavior-based associations between four items in an electronic catalog.
Figure 3B:
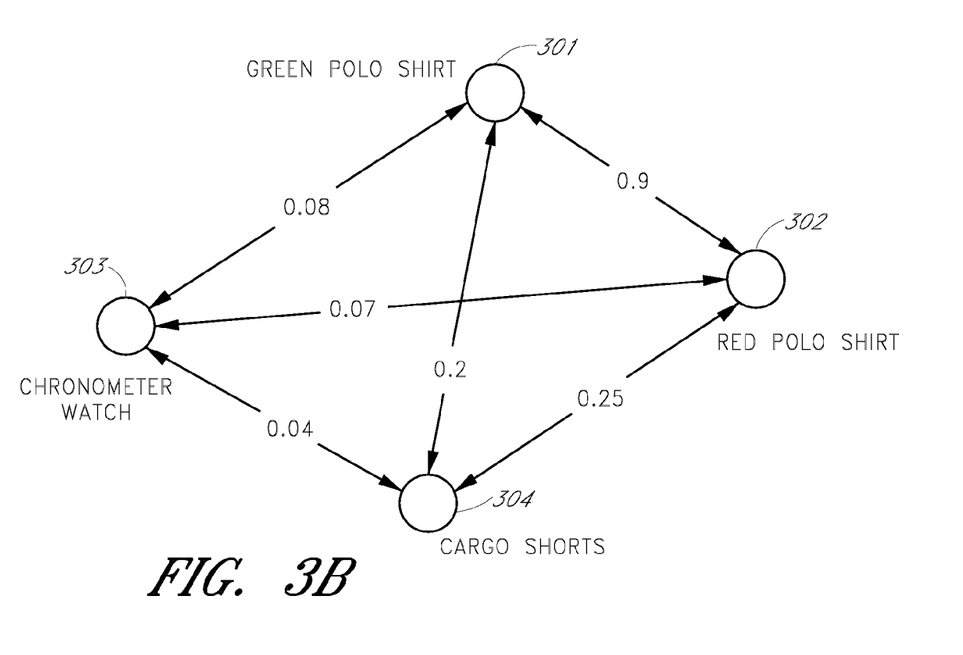
FIG. 3B is a graph depicting example content-based associations between the items of FIG. 3A.

FIG. 3A illustrates behavioral associations between four items, while FIG. 3B illustrates the content-based associations between these same items. For purposes of illustration, it may be assumed that these four items are the only items in the electronic catalog. FIG. 3A has few connections since not every item pair in a catalog may have behavioral data associated with it. Since the graphs of FIGS. 3A and 3B represent different domains, behavioral association and content association, respectively, the edges of each graph represent different kinds of relationships.

The behavioral association graph, FIG. 3A, shows some measure of intentional relationships. In FIG. 3A, a green polo shirt 301 is shown to have a behavioral association strength of forty to cargo shorts, and of ten to a chronometer watch. This does not necessarily mean that the chronometer watch 303 has a behavioral association strength of ten to the green polo shirt 301, since the arrow points from the green polo shirt 301 to the chronometer watch 303, and not vice versa. In other words, while the users who have selected the green polo shirt 301 have also selected the chronometer watch 303 to create a significant relationship for the shirt, it does not mean that these users create enough significance with respect to the chronometer watch's total selection base. The red polo shirt 302 has no edges because little or no behavioral data exists for the red polo shirt 302.

The content association graph, FIG. 3B, shows some measure of how innately similar items are. Since the content-based relationship is inherent to the pair of items, the directionality of the relationship between the pair of items is mutual, represented by bi-directional arrows. The content association strength or weight between the green polo shirt 301 and red polo shirt 302 has a value of 0.9. A value of 1.0 would mean that two items are identical. Consequently, the association strength value of 0.9 between the green polo shirt and the red polo shirt means that the two items are highly similar in content, which is understandable, since the only difference between the two items is their color.

Figure 3C:
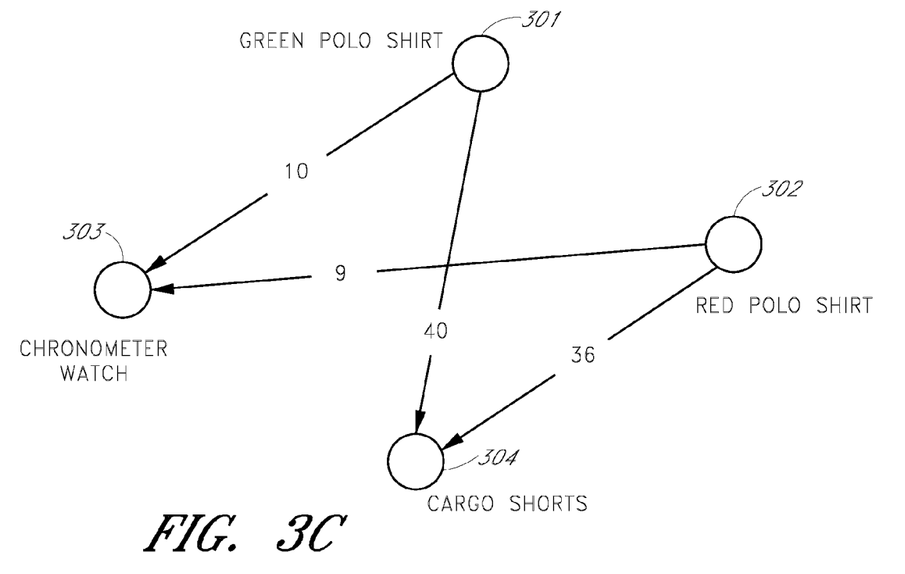
FIG. 3C illustrates how the behavioral and content-based associations of FIGS. 3A and 3B may be used in combination to create new associations between items.

FIG. 3C illustrates how the behavioral and content-based associations of FIGS. 3A and 3B may be used in combination to create extrapolated associations for the unpopular red polo shirt. Although this example illustrates an item inheriting behavioral association values from a single item, the sample equation given also works for an item inheriting behavioral association values from multiple items. As shown in FIG. 3A, there is no behavior-based association edge from the red polo shirt 302 to the cargo shorts 304. Consequently, the behavior-based association weight from the red polo shirt 302 to the cargo shirts 304 is zero. Running through the sample process of FIG. 2 would provide behavioral associations for the behavior-deficient red polo shirt 302 inherited from the behavioral associations of the green polo shirt 301. According to the sample equation given in FIG. 2 (step 207), the value of the new behavior-based association weight from the red polo shirt 302 to the cargo shorts 304 would equal the value of the old behavior-based association weight from the red polo shirt 302 to the cargo shorts 304 (which is zero, since no edge exists) plus the product of the content-based association weight from the red polo shirt 302 to the green polo shirt 301 (0.9 from FIG. 3B) multiplied by the behavior-based association weight of the green polo shirt 301 to the cargo shorts 304 (which is 40 from FIG. 3A). In other words, the value of the new behavior-based association weight from the red polo shirt 302 to the cargo shorts 304 is 0+(0.9*40)=36 (FIG. 3C). Similarly, the red polo shirt 302 would be associated with the watch 303 at a strength of 9=0+(0.9*10).

With these newly inherited (extrapolated) behavioral associations, when the detail page for the red polo shirt 302 is accessed in the electronic catalog, this detail page will display the cargo shorts 304 and chronometer watch 303 as related items, even though neither has a pure behavior-based association with the red polo shirt. (The decision of whether to display these related items on this detail page may depend on whether the strengths of the newly created associations exceed some threshold, and also on whether other related items exists that have stronger associations with the red polo shirt.) Thus user will thus desirably be exposed to related items that are behaviorally related to (e.g., commonly purchased in combination with) the red polo shirt. In some embodiments, the newly created associations may also cause the red polo shirt to show up on the detail pages for the cargo shorts and/or the chronometer watch.

Figure 3D:
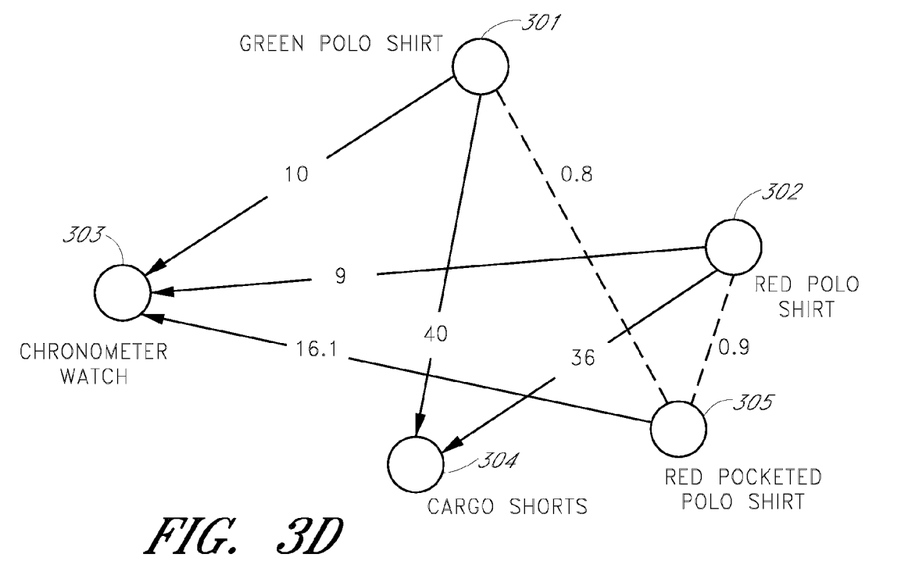
FIG. 3D illustrates how the behavioral and content-based associations of FIGS. 3A and 3B may be used in combination to create new associations for a newly added pocketed red polo shirt.

Continuing this example, assume that a red pocketed polo shirt 305 (FIG. 3D) is now added to the catalog, and does not yet have any behavioral data (e.g., it has not yet been purchased). Assume further that the red pocketed polo shirt 305 has a content-based association strength of 0.9 with the red polo shirt 302, and a content-based association strength value of 0.8 with the green polo shirt 301, as depicted by the dashed lines in FIG. 3D. If the process of FIG. 2 were applied, the result would be extrapolated associations between the new pocketed red polo shirt 305 with the watch 303 and the shorts 304, as shown in FIG. 3D. The strength of the newly created association would be (0.9×9)+(0.8 ×10)=16.1 for the watch 302 and (0.9×36)+(0.8×40)=64.4 for the shorts 304. As illustrated by this example, the fact that the red pocketed polo shirt 305 has similar attributes to multiple items that are behaviorally related to the watch 303 serves to increase the strength of the newly created association.

Once the system collects sufficient behavioral data for the red polo shirt 302 and the red pocketed polo shirt 305 (e.g., as the result of purchases of these items), the extrapolated associations may optionally be terminated or phased out in favor of behavior-based associations. If a phase-out process is used, the strengths of the extrapolated associations may, for example, be decreased in proportion to the amount of behavioral data collected for the associated items. The extrapolated associations may alternatively be phased out over time regardless of the quantity of behavioral data, such that extrapolated associations are only used for relatively new or newly added items (e.g., those added in the last five days).

II. Embodiments using Other Measures of Substitutability

In the embodiment described above, the content-based association weights generally represent the degree to which particular items are substitutable which each other. This is because items that have similar attributes or content (e.g., two camcorders with similar specifications) tend to be substitutes for each other. Content-based associations are thus one form of substitutability association.

Although item content (i.e., the content of, or descriptive of, a particular item) provides an effective mechanism for automatically measuring substitutability, the substitutability associations may be detected automatically using other sources of information. For example, as described in U.S. Pat. No. 6,912,505, substitutability associations can be detected by mining the session-specific item viewing histories of users, and particularly their session-specific item detail page viewing histories. This is because users tend to comparison shop for a particular type of item when they browse the catalog. Thus, for example, if a relatively large number of users who select item A for viewing also select item B for viewing during the same browsing session, items A and B are likely highly substitutable. In contrast, purchase-based associations tend to reveal items that are complementary of each other. Because catalog items tend to be viewed much more frequently than they are purchased (especially for high priced items), viewing-history-based (substitutability) associations can often be detected for a particular item even though the item is behavior deficient in the purchase domain.

Thus, for example, suppose that a purchase-based behavioral association exists between items A and B. Suppose further that item C has not been purchased (and is thus behavior deficient), but co-occurs relatively frequently with item A in the session-specific item detail page viewing histories of users. In this scenario, the viewing-based (substitutability) association between A and C may be used to create a new (extrapolated) association between B and C.

In the context of FIG. 1, this variation can be implemented by replacing the content-based association mining component 42 with a component that analyzes the session-specific item detail page viewing histories of users. The table 48 would still store substitutability association information (including weight values), but the associations would no longer be based on item content. Alternatively, both content-based mining and item viewing history mining can be used in combination to detect the substitutability associations. The behavior-based association mining component 44 would use purchase histories of users to detect the behavior-based associations represented in table 46.

III. Search Embodiment

Figure 4:
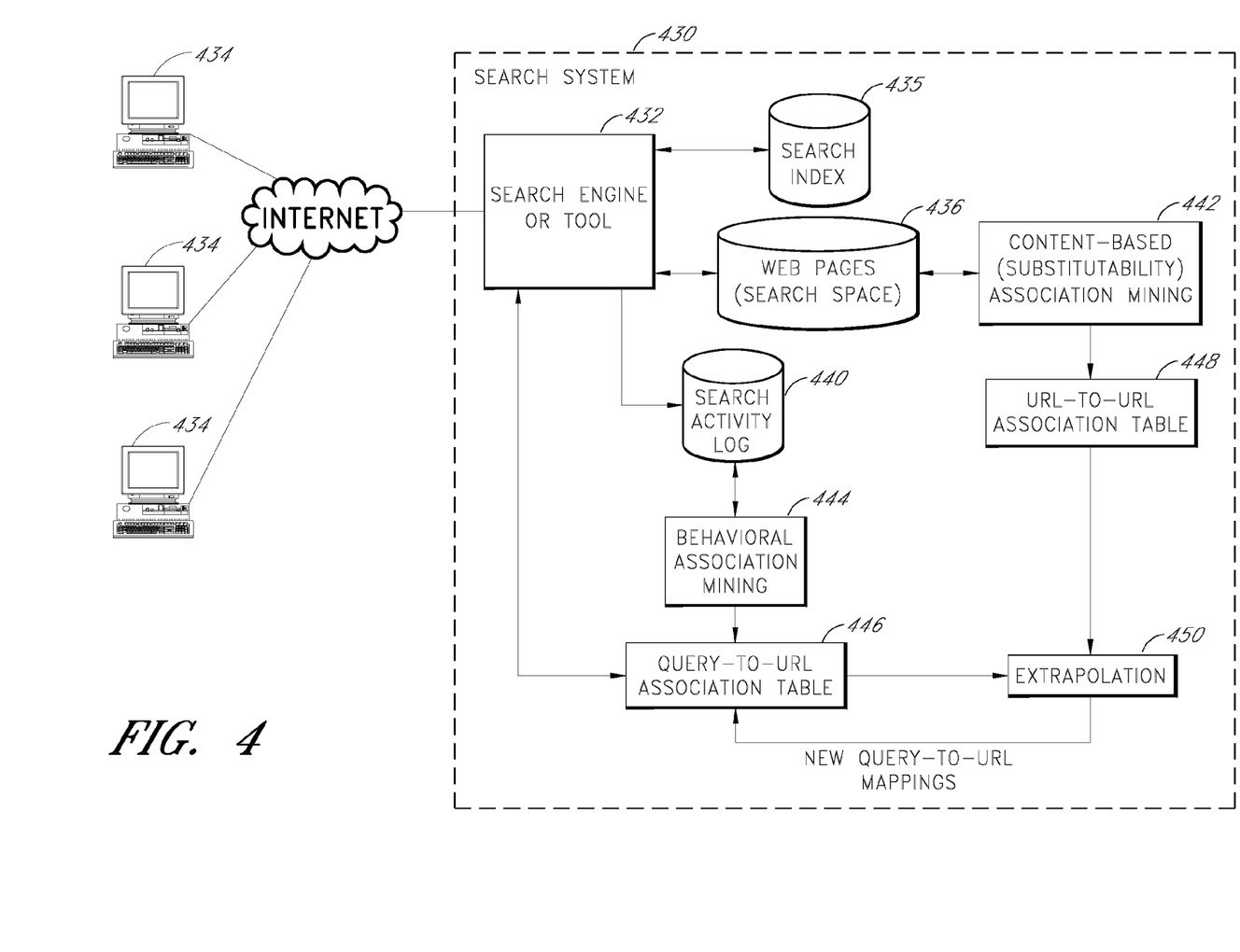
FIG. 4 illustrates an embodiment in which the new associations are created between search queries and search results.

FIG. 4 illustrates an embodiment in which the invention is employed for purposes of creating new associations between search queries and new or otherwise behavior-deficient items. In this particular example, the items are web pages in a search space, where the search space may, for example, be a particular web site, the Internet, or a corporate intranet. As will be apparent, the items could alternatively be products represented in an electronic catalog, blogs, podcasts, business listings in an online directory, other types of documents, or any other type of item for which keyword searches can be performed. The associations between search queries and items in this embodiment may be used for various purposes, such as to rank items in a search result listing, and/or to supplement the search result listing with additional items.

In this type of system, the quantity of behavioral data collected for a given page, may, in many cases, be insufficient to reliably detect behavior-based associations between that page and particular search queries. This may be the case where, for example, the page is new, such that few users have had the opportunity to click through to it from a search results listing. As with the catalog embodiment described above, this lack of behavioral data tends to be self perpetuating, as the lack of such data may cause the page to be displayed in a less prominent position in, or to be completely omitted from, search result listings.

As depicted in FIG. 4, the search system 430 in this embodiment includes a search engine 432 which responds to search queries (typically consisting of textual search strings) received over the Internet from users' computing devices 434. The search engine 432 may be implemented as software running on a single physical server or a collection of physical servers. The search engine 432 provides searchable access to a collection of web pages in a search space 436, with each web page identified by a unique uniform resource locator (URL). The pages represented in the search space 436 may include or consist of pages hosted by a single source or a wide variety of different sources. As illustrated, the search engine 432 may use a pre-generated search index 435 to identify web pages that match particular search queries.

As illustrated in FIG. 1, the search system 430 maintains a search activity log 440 containing activity data (behavioral data) descriptive of search activities of users. The stored activity data includes the submitted search queries, and includes identifiers, such as URLs, of the web pages selected by particular users. In some embodiments, the search activity log 440 may include data obtained from external sources, such as the search systems of business partners. Search histories of many hundreds of thousands or millions of unique users may be maintained and analyzed by the system 430. The search activity data may, for example, be stored in a chronological log file, or in a database of the type described in U.S. Pat. Pub. 2005/0033803 A1, the disclosure of which is hereby incorporated by reference.

As further illustrated in FIG. 1, a behavioral association mining component 444 collectively analyzes or "mines" the search activity data 440 periodically (e.g., once per day) to detect and quantify behavior-based associations between search queries and particular web pages. Examples of data mining algorithms that may be used for this purpose are described in U.S. Pat. No. 6,185,558, U.S. Patent Pub. 2005/0222987 A1 and U.S. patent application Ser. No. 11/276,079, filed Feb. 13, 2006, the disclosures of which are hereby incorporated by reference.

The behavioral association mining component 444 generates a table 446 or other data structure that identifies detected behavior-based associations between particular search queries and web page URLs. (The search queries represented in this table 446 may consist solely of search terms and phrases, or may, in some embodiments, also include other types of constraints such as search-field designations.) For each such pair of items, the table 446 also stores a behavioral association strength value or "weight" indicating the strength of the association. The associations may be based on any type or types of recorded user activity, such as search submissions, selections from search results, and/or previewing a search result. In general, the strength of the association between the pair will depend on how many users who submitted the search query thereafter selected the URL. Each entry in the table 446 may, for example, be in the form of a one-to-many mapping that maps a particular query to a list of the most closely related web pages, together with associated weights. Behavior-based associations that fall below a selected strength threshold may be excluded from the table 446.

Also illustrated in FIG. 1 is a content-based association mining component 442 that periodically analyzes the web pages in the search space 436 to detect and quantify content-based associations between particular pages. The content-based association mining component 442 generates a URL-to-URL association table 448 that identifies pairs of web pages that share similar characteristics or content. For each such pair, the table 448 also stores a respective content-based association strength value or weight. These values generally represent the substitutability of particular pairs of web pages. The table 448 may be generated such that each URL pair consists of a URL of a behavior-deficient web page and a URL of a non-behavior-deficient web page. Content-based associations that fall below a selected threshold (e.g., 80% similarity) may be excluded from the table 448.

The behavior-based and content-based associations tables 446, 448 are periodically analyzed in combination by an extrapolation component 450 to selectively extrapolate or propagate behavior-based associations to new or otherwise behavior-deficient web pages, as described above. The extrapolation may be performed using substantially the same process shown in FIG. 2 and described above. For example, if the query-to-URL association table 446 indicates that search query Q is behaviorally associated with page P, and the URL-to-URL association table 448 indicates that behavior-deficient web page D has a content-based association with P, the extrapolation component 450 may create a new, extrapolated association between Q and D. For extrapolated associations added to the query-to-URL association table 446, the weights are generated based on the corresponding behavior-based and content-based weights, as described below. These extrapolated association weights may be normalized with (on the same general scale as) the purely behavior-based weights.

The augmented query-to-URL table 446 may be used to provide users with "behaviorally integrated" search results that depend on the actions of past users. For example, when a user submits a search query to the search engine 432, the search system 430 may access the query-to-URL association table 446 to rank the matching web pages for display. The search system may additionally or alternatively augment the list of matching web pages with additional web pages that do not "match" the search query, but which have actual or extrapolated behavioral associations with the search query.

Figure 5A:
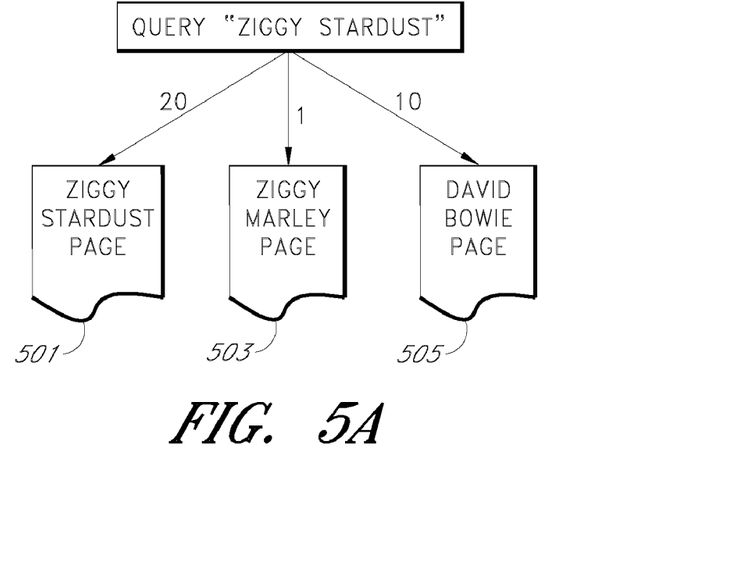
FIG. 5A is a graph depicting behavior-based associations between a search query and items (web pages) in a search space.
Figure 5B:
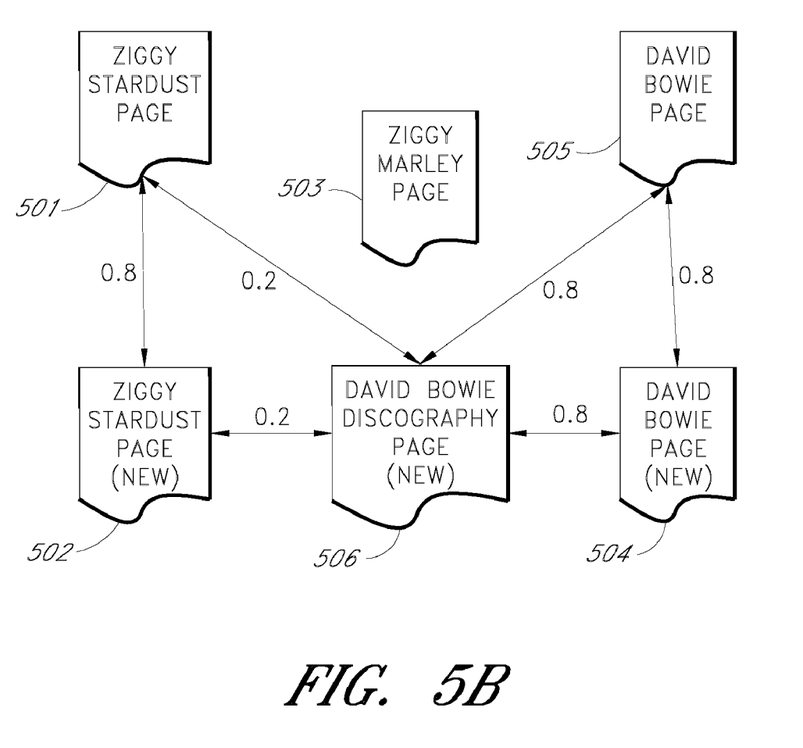
FIG. 5B is a graph depicting content-based associations between the items in FIG. 5A and three newly added items.
Figure 5C:
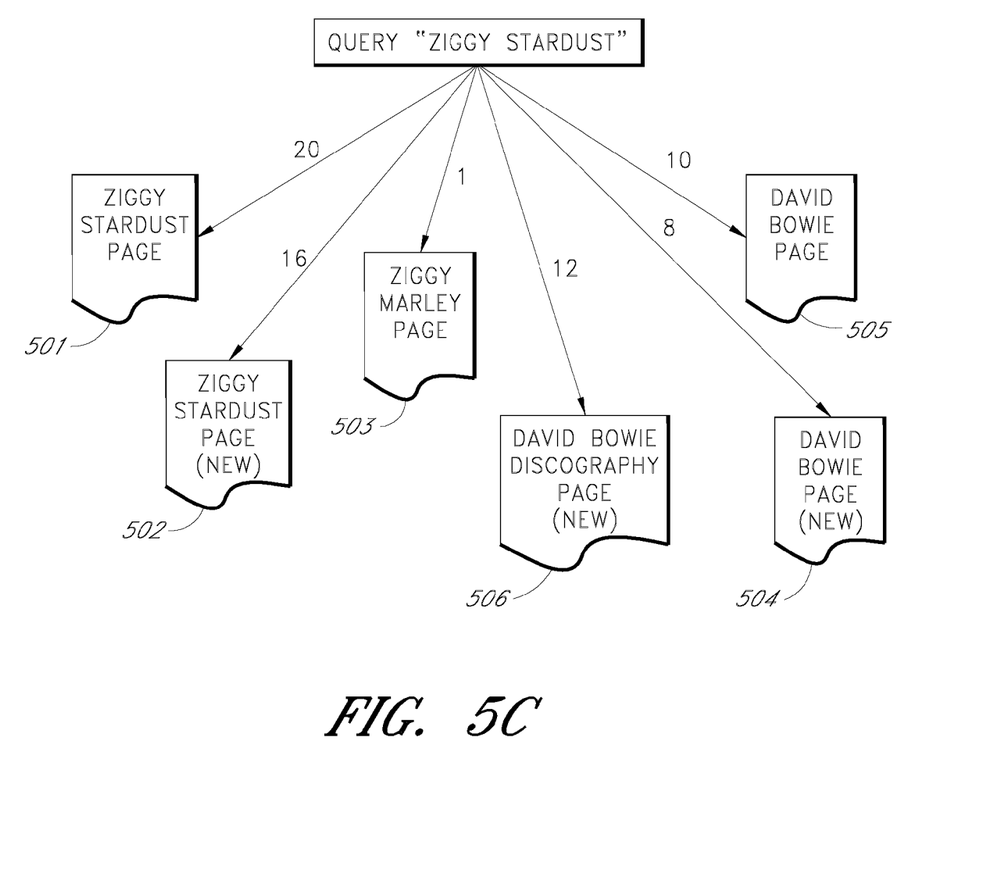
FIG. 5C illustrates how the behavioral and content-based associations of FIGS. 5A and 5B may be used in combination to create new associations between the search query and particular items.

FIGS. 5A-5C illustrate a simple example of how new query-to-item associations may be formed between the search query "ziggy stardust" and newly added web pages. As depicted in FIG. 5A, the search space initially contains three web pages that are potentially related to this search query: a page 501 about the Ziggy Stardust phase of David Bowie's career, a page 503 about Ziggy Marley 503, and a page 505 about David Bowie but with no occurrences of either "Ziggy" or "Stardust." A standard (non-behaviorally integrated) search for "Ziggy Stardust" would return the matching Ziggy Stardust page and possibly the partially matching Ziggy Marley page, but would not return the David Bowie page (despite its higher degree of relevance).

Assume further that behavior-based associations exist between the search query "ziggy stardust" and pages 501, 503 and 505 with strengths of twenty, one and ten, respectively, as depicted in FIG. 5A. (Note that the behavior-based association with the non-matching David Bowie page 505 may have been created by detecting that users who searched for "ziggy stardust" often eventually accessed the David Bowie page 505, even though this page did not shown up in the search results.) With these associations, a behaviorally integrated search query for "ziggy stardust" will desirably return all three pages, 501, 503 and 505. These pages may be displayed in the search results listing from highest to lowest behavior-based strength.

With reference to FIG. 5B, assume that three new pages are now added to the search space, a new Ziggy Stardust page 502, a new David Bowie page 504, and a new David Bowie Discography page 506 which includes a timeline mentioning Bowie's Ziggy Stardust phase. Because these pages are new, very little or no behavioral data is associated with them (i.e., they are behavior deficient), at least for the search query "ziggy stardust." As a result, the new Ziggy Stardust page 502 will likely appear at or near the bottom of the behaviorally integrated search results, and the David Bowie Discography page 506 might also appear at the bottom depending on how well the search engine's text-based parsing performs. The new David Bowie page 504 will not appear in the search results, even though it is relevant to the search query. Further, due to the lack of exposure of these new pages in search results, they will likely rarely be selected, and thus will remain behaviorally deficient. Consequently, these new pages suffer from the cold-start problem. The extrapolation methods described herein alleviate this problem, allowing these new pages 502-506 to be immediately displayed in relatively prominent positions in the search results.

FIG. 5B illustrates an example set of content-based associations between these newly added web pages 502-506 and the pre-existing pages. The weight values are again on a scale of 0 to 1, with a weight of 1 representing the highest detectable level of content similarity (and thus substitutability). The absence of an arrow between two pages means that they are not sufficiently similar in content to detect or form a content-based association, or equivalently, that they have a content-based association of zero. As shown, the new Ziggy Stardust page 502 has a content-based association value of 0.8 with the preexisting Ziggy Stardust page 501, 0.2 with the David Bowie Discography page 506, and 0 for the rest of the pages. Similarly, the new David Bowie page 504 has a content-based association value of 0.8 with the preexisting David Bowie page 505 and the David Bowie Discography page 506, and 0 for all other pages. Finally, the David Bowie Discography page 506 has a content-based association with the new David Bowie and Ziggy Stardust pages as previously described and has associations with the preexisting David Bowie and Ziggy Stardust pages with values of 0.8 and 0.2, respectively. The content-based associations between the web pages may be detected and quantified using well known text and linguistic analysis algorithms.

FIG. 5C illustrates the set of behavior-based associations (including inherited or "extrapolated" associations) that exist after the new web pages 502 and 504 inherit the behavior-based associations of their respective content-similar neighbors 501 and 505. According to the example equation given in FIG. 2 (step 207), the strength of the new association between the search query and the new Ziggy Stardust page 502 is 0.8×20=16. Similarly, the strength of the new association between the search query and the new David Bowie page 504 is 0.8×10=8. Finally, the strength of the extrapolated association between the search query and the new David Bowie Discography page 506 is (0.8×10)+(0.2×20)=12. Now, when a search is conducted for "ziggy stardust," the newly added pages 502, 504 and 506 will desirably be displayed in more prominent positions in the search results than the Ziggy Marley page 503 since they have stronger (inherited) behavior-based associates with this query.

As will be recognized, the search-based embodiment shown in FIG. 4 may be used in the context of a catalog search engine to assist users in locating items, such as products, in an electronic catalog. In such embodiments, the content-based association mining component 442 of FIG. 4 may be replaced by, or used in combination with, a component that assesses item substitutability by analyzing session-specific item viewing histories, as described above.

The search-based embodiment described above can be extended to include general user input instead of just search queries. In this regard, a search query is just one type of user input that can be associated with particular items. Other forms of user input include keywords, tags, captions, and discussion items.

The catalog-based and search-based embodiments described above can also be combined in various ways such that both item-to-item and query-to-item associations are extrapolated to behavior-deficient items.

IV. Extrapolations of other Types of Associations

As will be apparent, the inventive methods described herein can also be used to extrapolate other types of behavior-based associations to behavior-deficient items. For example, in the context of online advertising systems that select ads to display on web pages (typically across a number of participating ad publishing sites), the system may detect behavior-based associations between particular ads and particular web pages. These associations may be based on ad click-through rates (e.g., ad A is associated with page P because a relatively large number of those who have viewed page P with ad A have clicked on ad A), and may be used by the ad server system to dynamically select ads for display. In such a system, when a new web page becomes available for purposes of displaying ads, the page may initially be matched to one or more other web pages (potentially of other web sites) based on content similarities. The new (behavior-deficient) web page may then inherit the ad-to-page associations of these content-similar web pages, increasing the likelihood that particular ads will be selected for display on the new page. As a variation of this embodiment, behavior-based associations between particular ads and particular web sites may be extrapolated to new web sites.

As another example, U.S. application Ser. No. 10/766,368, filed Jan. 28, 2004, the disclosure of which is hereby incorporated by reference herein, discloses methods for detecting behavior-based associations between particular catalog items (e.g., products available for purchase) and particular web sites. When a new web site becomes available, the disclosed extrapolation methods may be used to create new associations between particular catalog items and the new web site. These newly created associations may, for example, be used to select catalog items to recommend to users who visit the new web site, and/or to suggest web sites to users who view or purchase particular products.

V. Conclusion

All of the methods and processes described above may be embodied in, and fully automated via, software code modules executed by one or more general purpose computers. The code modules may be stored in any type of computer-readable medium or other computer storage device. Some or all of the methods may alternatively be embodied in specialized computer hardware. The behavioral data and association tables may be stored in any type of computer data repository, such as relational databases and flat files systems that use magnetic disk storage and/or solid state RAM.

Although this invention has been described in terms of certain embodiments and applications, other embodiments and applications that are apparent to those of ordinary skill in the art, including embodiments which do not provide all of the features and advantages set forth herein, are also within the scope of this invention. The scope of the present invention is intended to be defined only by reference to the following claims.

What is claimed is:

1. A computer-implemented method of detecting associations between items represented in an electronic catalog, the method comprising:

maintaining item selection histories of each of a plurality of users of the electronic catalog, said item selection histories identifying particular items selected by particular users;

detecting a behavior-based association between two items represented in the electronic catalog, item A and item B, at least in part by programmatically analyzing said item selection histories, wherein detecting the behavior-based association comprises generating a first data value that represents a strength of the behavior-based association between items A and B;

detecting a substitutability association between item A and an additional item, item C, represented in the electronic catalog, wherein detecting the substitutability association comprises generating a second data value that represents a strength of the substitutability association between items A and C;

creating an association between item B and item C based at least partly on the detected behavior-based association between items A and B in combination with the detected substitutability association between items A and C, wherein creating said association comprises generating a third data value that represents a strength of the association between items B and C, such that the third data value is dependent on the first and second data values; and using the created association between item B and item C as a basis for selecting an item to recommend to one or more users;

said method performed in its entirety by a computer system that comprises one or more computers.

2. The method of claim 1, wherein the substitutability association is detected, at least in part, by analyzing attributes of items A and C.

3. The method of claim 1, wherein the substitutability association is detected, at least in part, by analyzing item viewing histories of users of the electronic catalog.

4. The method of claim 3, wherein the behavior-based association is detected based on purchase histories of users.

5. The method of claim 1, wherein item C is a behavior-deficient item.

6. The method of claim 5, further comprising phasing out or terminating the created association between items B and C in response to the collection of sufficient item selection history data for creating behavioral-based associations between item C and other items.

7. The method of claim 1, wherein item B and item C are not substitutable.

8. The method of claim 1, wherein the association created between items B and C is a directional association from item C to item B.

9. A non-transitory computer-readable storage medium or system having stored thereon executable instructions that, when executed, cause a computer system to perform a method that comprises:

storing item selection histories of each of a plurality of users of an electronic catalog, said item selection histories identifying particular items selected by particular users;

detecting a behavior-based association between two items represented in the electronic catalog, item A and item B, at least in part by analyzing said item selection histories, wherein detecting the behavior-based association comprises generating a first data value that represents a strength of the behavior-based association between items A and B;

detecting a substitutability association between item A and an additional item, item C, represented in the electronic catalog, wherein detecting the substitutability association comprises generating a second data value that represents a strength of the substitutability association between items A and C;

creating, in computer storage, an association between item B and item C based at least partly on the detected behavior-based association between items A and B in combination with the detected substitutability association between items A and C, wherein creating said association comprises generating a third data value that represents a strength of the association between items B and C, such that the third data value is dependent on the first and second data values; and selecting an item to recommend based at least partly on the association created between item B and item C.

10. A system for detecting associations between items represented in an electronic catalog of items, the system comprising:

a computer system comprising one or more computers, said computer system configured to implement:

an item data repository that stores catalog descriptions of items represented in the electronic catalog;

a substitutability association mining component that detects substitutability associations between particular items represented in the electronic catalog, at least in part, by analyzing said catalog descriptions;

a data repository that stores item selection histories of a plurality of users of the electronic catalog, said item selection histories identifying particular items selected by particular users;

a behavior-based association mining component that detects behavior-based associations between particular items, at least in part, by analyzing the item selection histories of the plurality of users; and an extrapolation component that detects additional associations between items by combining the detected substitutability associations with the detected behavior-based associations, said extrapolation component configured to extrapolate a behavior-based association between items A and B to item C by a process that comprises using at least a first data value that represents a strength of the behavior-based association between items A and B, in combination with a second data value that represents a strength of a substitutability association between items A and C, to calculate a third data value that represents a strength of an association between items B and C.

11. The system of claim 10, wherein the extrapolation component is capable of creating an association between two items between which no behavior-based association and no content-based association exists.

12. The system of claim 10, wherein the substitutability association mining component additionally uses item viewing histories of users to detect said substitutability associations.

13. The system of claim 10, wherein the item selection histories are item purchase histories.

14. The system of claim 10, further comprising a recommendation system that uses the associations detected by the extrapolation component to select items to recommend to users.

15. The method of claim 1, wherein creating the association between item B and item C is performed at least partly in response to a programmatic determination that item C is a behavior-deficient item.

16. The method of claim 1, wherein using the created association as a basis for selecting an item to recommend comprises using the association created between items B and C as a basis for supplementing an electronic catalog page for item C with an indication that item B is related to item C.

17. The method of claim 1, wherein the method comprises using the created association as a basis to select item C to recommend to a user based on a selection by the user of item B.

18. The non-transitory computer storage medium or system of claim 9, wherein the substitutability association is detected based at least partly on an automated comparison of item attributes of items A and C.

* * * * *